US011485378B2

(12) United States Patent
Takeda et al.

(10) Patent No.: US 11,485,378 B2
(45) Date of Patent: Nov. 1, 2022

(54) VEHICLE CONTROL SYSTEM

(71) Applicant: HONDA MOTOR CO., LTD., Tokyo (JP)

(72) Inventors: Masanori Takeda, Saitama (JP); Takashi Yanagi, Saitama (JP); Takeyuki Suzuki, Saitama (JP); Ryo Yamazaki, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 246 days.

(21) Appl. No.: 17/095,990

(22) Filed: Nov. 12, 2020

(65) Prior Publication Data

US 2021/0171051 A1 Jun. 10, 2021

(30) Foreign Application Priority Data

Dec. 9, 2019 (JP) .............................. JP2019-221852

(51) Int. Cl.
 *B60W 50/14* (2020.01)
 *B60W 50/08* (2020.01)
 (Continued)

(52) U.S. Cl.
 CPC .......... *B60W 50/082* (2013.01); *B60W 10/20* (2013.01); *B60W 40/06* (2013.01);
 (Continued)

(58) Field of Classification Search
 CPC .. B60W 40/06; B60W 40/105; B60W 50/082; B60W 50/14; B60W 50/16;
 (Continued)

(56) References Cited

U.S. PATENT DOCUMENTS

| 6,480,768 | B1 * | 11/2002 | Torii ................... G05D 1/0278 701/25 |
| 9,227,632 | B1 | 1/2016 | Lee |
| 10,725,470 | B2 * | 7/2020 | Mahabadi ............ G05D 1/0088 |
| 2013/0345900 | A1 | 12/2013 | Usui |

(Continued)

FOREIGN PATENT DOCUMENTS

| JP | 2015003566 A | 1/2015 |
| JP | 2017189989 A | 10/2017 |

(Continued)

OTHER PUBLICATIONS

Notice of Reasons for Refusal for Patent Application JP 2019-221852 dated May 24, 2022; 14 pp.

*Primary Examiner* — Edwin A Young
(74) *Attorney, Agent, or Firm* — Armstrong Teasdale LLP

(57) ABSTRACT

A vehicle control system includes: a travel control unit configured to switch a driving mode of a vehicle; a traveling state detecting unit configured to detect a traveling state of the vehicle; a generating unit configured to generate at least one turning line; an external environment recognizing device configured to detect a state of an external environment of the vehicle; a setting unit configured to set a traveling area in front of the vehicle in a traveling direction thereof; and a determining unit configured to determine whether the turning line is located in the traveling area. In a case where the determining unit determines that the turning line is not located in the traveling area while a manual driving mode is selected, the travel control unit switches the driving mode of the vehicle from the manual driving mode to an autonomous driving mode.

12 Claims, 12 Drawing Sheets

(51) Int. Cl.
*B60W 40/06* (2012.01)
*B60W 40/105* (2012.01)
*B60W 10/20* (2006.01)
*G06V 20/58* (2022.01)
*G06V 20/56* (2022.01)
*B60W 50/00* (2006.01)

(52) U.S. Cl.
CPC .......... *B60W 40/105* (2013.01); *B60W 50/14* (2013.01); *G06V 20/58* (2022.01); *G06V 20/588* (2022.01); *B60W 2050/007* (2013.01); *B60W 2050/146* (2013.01); *B60W 2552/53* (2020.02)

(58) Field of Classification Search
CPC .......... B60W 60/0051; B60W 60/007; B60W 2552/53; B60W 2050/007; B60W 2050/146; G06V 20/58; G06V 20/588
See application file for complete search history.

(56) References Cited

U.S. PATENT DOCUMENTS

| | | | | |
|---|---|---|---|---|
| 2014/0229069 | A1* | 8/2014 | Akiyama | ............... B62D 6/002 701/41 |
| 2017/0235305 | A1* | 8/2017 | Jung | ....................... G05D 1/021 701/23 |
| 2017/0351256 | A1 | 12/2017 | Kumakiri et al. | |
| 2018/0105184 | A1 | 4/2018 | Urano et al. | |
| 2019/0210586 | A1 | 7/2019 | Aizawa et al. | |
| 2019/0286127 | A1 | 9/2019 | Watanabe et al. | |

FOREIGN PATENT DOCUMENTS

| | | |
|---|---|---|
| JP | 2017218020 A | 12/2017 |
| JP | 2018062321 A | 4/2018 |
| JP | 2018144782 A | 9/2018 |
| JP | 2019519425 A | 7/2019 |
| JP | 2019156232 A | 9/2019 |
| WO | 2012114433 A1 | 8/2012 |

* cited by examiner

Fig.8A 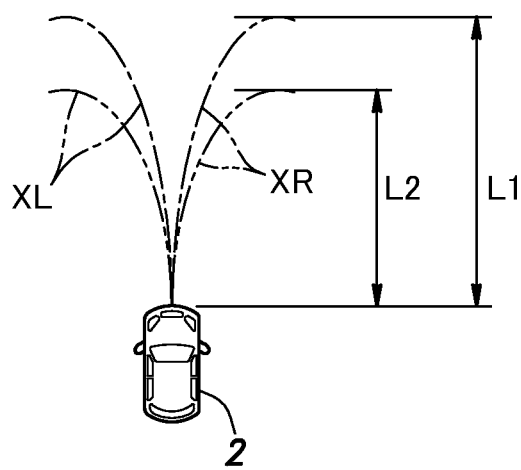 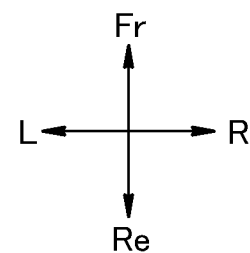
Fig.8B 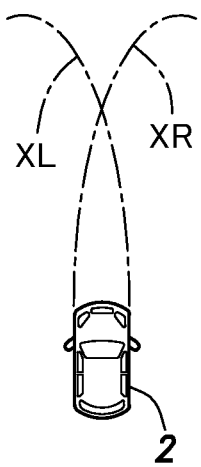 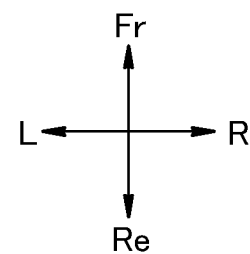
Fig.8C 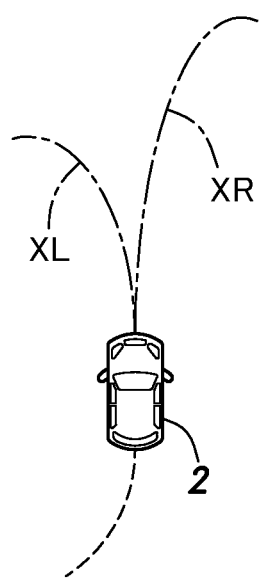 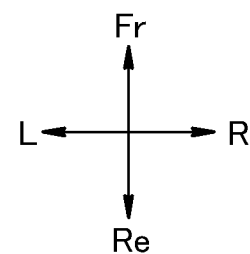

Fig.9 turning radius table

| steering angle (°) | vehicle speed (km/h) | | | | | | | | | | |
|---|---|---|---|---|---|---|---|---|---|---|---|
| | 0 | 10 | 20 | 30 | 40 | 50 | 60 | 70 | 80 | 90 | 100 |
| 0 | 0 | 0 | 0 | 0 | 0 | 0 | 0 | 0 | 0 | 0 | 0 |
| 45 | 0 | 5 | 5 | 5 | 5 | 10 | 15 | 20 | 50 | 55 | 60 |
| 90 | 0 | 5 | 5 | 5 | 5 | 10 | 15 | 20 | 50 | 60 | |
| 135 | 0 | 5 | 5 | 10 | 10 | 15 | 20 | 50 | 60 | | |
| 180 | 0 | 5 | 5 | 10 | 15 | 20 | 50 | 60 | | | |
| 225 | 0 | 5 | 10 | 20 | 50 | 50 | 60 | | | | |
| 270 | 0 | 5 | 10 | 20 | 50 | 60 | | | | | | each numerical value in the above table indicates a turning radius (m) in a steady state of a vehicle

VEHICLE CONTROL SYSTEM

TECHNICAL FIELD

The present invention relates to a vehicle control system.

BACKGROUND ART

A vehicle control system known in the art switches a driving mode of a vehicle between a manual driving mode and an autonomous driving mode (for example, JP2018-62321A). In the manual driving mode, the vehicle travels in response to a driving operation on an operation element (for example, a steering wheel) by an occupant. On the other hand, in the autonomous driving mode, the vehicle travels autonomously without the driving operation on the operation element by the occupant.

Sometimes it becomes difficult to cause the vehicle to travel in a prescribed area when the vehicle travels in response to the driving operation on the operation element by the occupant. In such a case, the driving mode of the vehicle needs to be switched from the manual driving mode to the autonomous driving mode at an appropriate timing.

SUMMARY OF THE INVENTION

In view of such a problem of the prior art, a primary object of the present invention is to provide a vehicle control system that can switch a driving mode of a vehicle from a manual driving mode to an autonomous driving mode at an appropriate timing.

To achieve such an object, one embodiment of the present invention provides a vehicle control system (1) including: a travel control unit (12) configured to switch a driving mode of a vehicle (2) between an autonomous driving mode and a manual driving mode; a traveling state detecting unit (45) configured to detect a traveling state of the vehicle; a generating unit (71) configured to generate at least one turning line (XR, XL) based on a signal from the traveling state detecting unit, the turning line indicating a prospective turning trajectory of the vehicle; an external environment recognizing device (46) configured to detect a state of an external environment of the vehicle; a setting unit (72) configured to set a traveling area in front of the vehicle in a traveling direction thereof based on a signal from the external environment recognizing device, the traveling area being an area in which the vehicle should travel; and a determining unit (73) configured to determine whether the turning line is located in the traveling area, wherein in a case where the determining unit determines that the turning line is not located in the traveling area while the manual driving mode is selected, the travel control unit switches the driving mode of the vehicle from the manual driving mode to the autonomous driving mode.

According to this arrangement, it is possible to switch the driving mode of the vehicle from the manual driving mode to the autonomous driving mode at an appropriate timing.

In the above arrangement, preferably, the generating unit is configured to respectively generate a right turning line and a left turning line, the right turning line being the turning line to the right, the left turning line being the turning line to the left, and the determining unit determines whether the right turning line is located in the traveling area in a case where the vehicle approaches a left edge (YL) of the traveling area, and determines whether the left turning line is located in the traveling area in a case where the vehicle approaches a right edge (YR) of the traveling area.

According to this arrangement, it is possible to appropriately determine whether the turning line is located in the traveling area according to a direction in which the vehicle is estimated to deviate from the traveling area, and thus to prevent the driving mode from being excessively switched from the manual driving mode to the autonomous driving mode. Further, the determining unit can reduce the load of a determination process by determining only whether one of the turning lines is located in the traveling area, as compared with a case where the determining unit determines whether both the turning lines are located in the traveling area.

In the above arrangement, preferably, the determining unit compares the right turning line with the left edge of the traveling area and thus determines whether the right turning line is located in the traveling area in the case where the vehicle approaches the left edge of the traveling area, and compares the left turning line with the right edge of the traveling area and thus determines whether the left turning line is located in the traveling area in the case where the vehicle approaches the right edge of the traveling area.

According to this arrangement, it is possible to more appropriately determine whether the turning line is located in the traveling area, and thus to more reliably prevent the driving mode from being excessively switched from the manual driving mode to the autonomous driving mode.

In the above arrangement, preferably, the vehicle control system further includes a turning state detecting unit (45E) configured to detect a turning state of the vehicle, wherein the generating unit is configured to correct the turning line based on a signal from the turning state detecting unit.

According to this arrangement, it is possible to generate an appropriate turning line according to the turning state of the vehicle.

In the above arrangement, preferably, the external environment recognizing device includes an obstacle detecting unit (48) configured to detect an obstacle (Q) present around the vehicle, and the setting unit is configured to set the traveling area such that the traveling area avoids the obstacle.

According to this arrangement, it is possible to set an appropriate traveling area in consideration of the obstacle.

In the above arrangement, preferably, the vehicle control system includes: an operation element (10) configured to receive a turning operation; a steering device (4) configured to turn wheels in response to the turning operation on the operation element; and a reaction force applying device (43) configured to increase a reaction force to the turning operation on the operation element in the case where the determining unit determines that the turning line is not located in the traveling area.

According to this arrangement, it is possible to make the occupant aware that it becomes difficult to turn the wheels in response to the turning operation on the operation element.

In the above arrangement, preferably, the vehicle control system further includes: an operation element configured to receive a turning operation; and a steering device configured to turn wheels in response to the turning operation on the operation element, wherein in the case where the determining unit determines that the turning line is not located in the traveling area, the travel control unit does not transmit a control signal corresponding to the turning operation to the steering device even when the operation element receives the turning operation.

According to this arrangement, by using a simple configuration, it is possible to prevent the wheels from being turned in response to the turning operation on the operation element.

In the above arrangement, preferably, the operation element is configured to issue a warning in the case where the determining unit determines that the turning line is not located in the traveling area.

According to this arrangement, it is possible to prevent the occupant from continuing the turning operation on the operation element even though it becomes difficult to turn the wheels in response to the turning operation on the operation element.

In the above arrangement, preferably, the traveling state detecting unit includes a vehicle speed sensor (45A) configured to detect a vehicle speed of the vehicle, and the generating unit is configured to decrease a degree of curvature of the turning line as the vehicle speed of the vehicle increases.

According to this arrangement, it is possible to generate an appropriate turning line according to the vehicle speed of the vehicle.

In the above arrangement, preferably, the generating unit is configured to generate the turning line such that curvature of the turning line increases toward the front in the traveling direction of the vehicle.

According to this arrangement, it is possible to generate an appropriate turning line according to prospective changes in the turning angle of the wheels and the vehicle speed of the vehicle after the driving mode is switched from the manual driving mode to the autonomous driving mode.

In the above arrangement, preferably, in a case where the determining unit determines that the turning line crosses an edge of the traveling area and thus reaches an inside of the traveling area while the autonomous driving mode is selected and an end of the turning line on a vehicle side is located outside the traveling area, the travel control unit switches the driving mode of the vehicle from the autonomous driving mode to the manual driving mode.

According to this arrangement, it is possible to switch the driving mode of the vehicle from the autonomous driving mode to the manual driving mode at an appropriate timing.

Thus, according to the above arrangements, it is possible to provide a vehicle control system that can switch a driving mode of a vehicle from a manual driving mode to an autonomous driving mode at an appropriate timing.

BRIEF DESCRIPTION OF THE DRAWINGS

FIG. 8A is a plan view illustrating how to generate turning lines accordingly to one suitable embodiment;

FIG. 8B is a plan view illustrating how to generate turning lines accordingly to another suitable embodiment;

FIG. 8C is a plan view illustrating how to generate turning lines;

FIG. 9 is an example of a turning radius table;

DESCRIPTION OF THE PREFERRED EMBODIMENT(S)

In the following, an embodiment of a vehicle control system 1 according to the present invention will be described with reference to the drawings. Arrows Fr, Re, L, R, U, and Lo, which are appropriately attached to FIG. 2 and subsequent drawings, respectively indicate a front side, a rear side, a left side, a right side, an upper side, and a lower side of a vehicle 2 in which the vehicle control system 1 is provided. In the present embodiment, the lateral direction is defined as the vehicle width direction of the vehicle 2, and the fore and aft direction is defined as the vehicle length direction of the vehicle 2.

<The Configuration of the Vehicle Control System 1>

Figure 1:
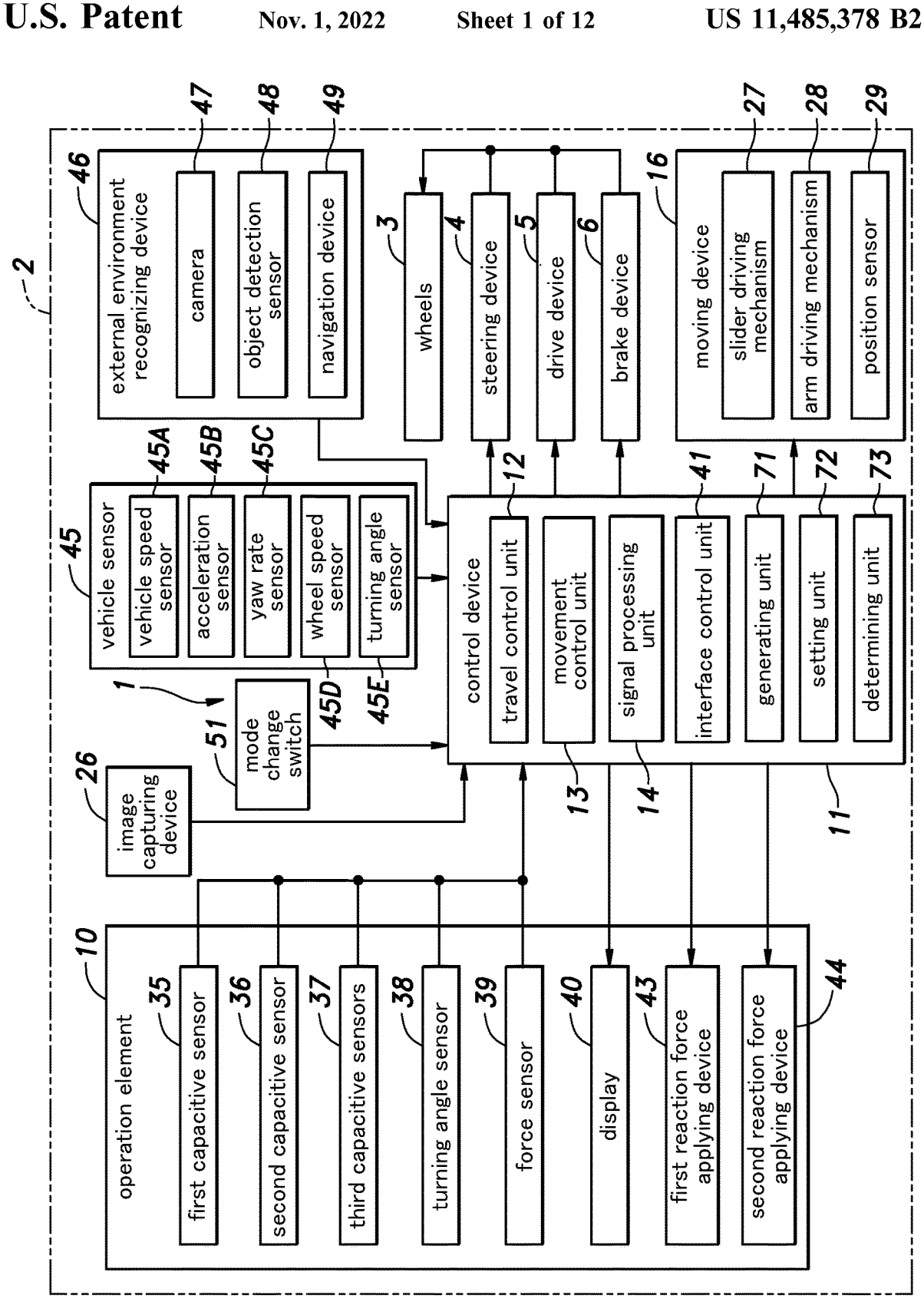
FIG. 1 is a block diagram of a vehicle control system according to an embodiment of the present invention.

As shown in FIG. 1, the vehicle control system 1 is provided in a vehicle 2 which is capable of autonomous driving. The vehicle 2 can travel either in a manual driving mode in which an occupant X mainly performs a driving operation or in an autonomous driving mode in which the vehicle 2 (more specifically, an undermentioned control device 11) mainly performs the driving operation. The vehicle 2 includes a steering device 4 configured to turn (steer) wheels 3 of the vehicle 2, a drive device 5 configured to rotate the wheels 3, and a brake device 6 configured to apply the brakes to the wheels 3.

The steering device 4 is a device configured to change a turning angle (steering angle) of each wheel 3, and includes an electric motor and a steering mechanism configured to turn (steer) the wheels 3 by a driving force of the electric motor. The steering mechanism includes, for example, a rack-and-pinion mechanism. The drive device 5 is a device configured to rotate the wheels 3, and includes at least one of an electric motor and an internal combustion engine. The drive device 5 further includes a transmission mechanism configured to transmit a driving force of the at least one of the electric motor and the internal combustion engine to the wheels 3. If the drive device 5 includes the internal combustion engine, the drive device 5 can apply the brakes to the wheels 3 by engine braking. If the drive device 5 includes the electric motor, the drive device 5 can apply the brakes to the wheels 3 by regenerative braking. The brake device 6 is a device configured to apply resistance to the wheels 3 and thus stop the rotation of the wheels 3. The brake device 6 includes an electric motor, a hydraulic pressure generating device configured to generate hydraulic pressure as the electric motor is driven, and a brake caliper that presses a brake pad against a brake rotor on receiving the hydraulic pressure from the hydraulic pressure generating device.

The vehicle control system 1 includes an operation element 10 provided with various sensors and a control device 11 connected to the operation element 10. The operation element 10 is a device configured to receive a driving operation by the occupant X to steer the vehicle 2. The operation element 10 may include, for example, a steering wheel or a control stick. An outline of the operation element 10 may be formed in a shape such as a circular shape, a rectangular shape, a shape formed by cutting off a part of a circle, or a shape formed by combining left and right arc parts and upper and lower straight-line parts. The control device 11 includes a hardware processor such as a CPU. The control device 11 includes a travel control unit 12, a movement control unit 13, and a signal processing unit 14. The signal processing unit 14 is configured to detect an operation input by the occupant X based on a signal from the operation element 10, and the travel control unit 12 is configured to control at least one of the steering device 4, the drive device 5, and the brake device 6 according to the operation input detected by the signal processing unit 14. The movement control unit 13 is configured to control the movement of the operation element 10 according to the operation input detected by the signal processing unit 14.

Figure 2:
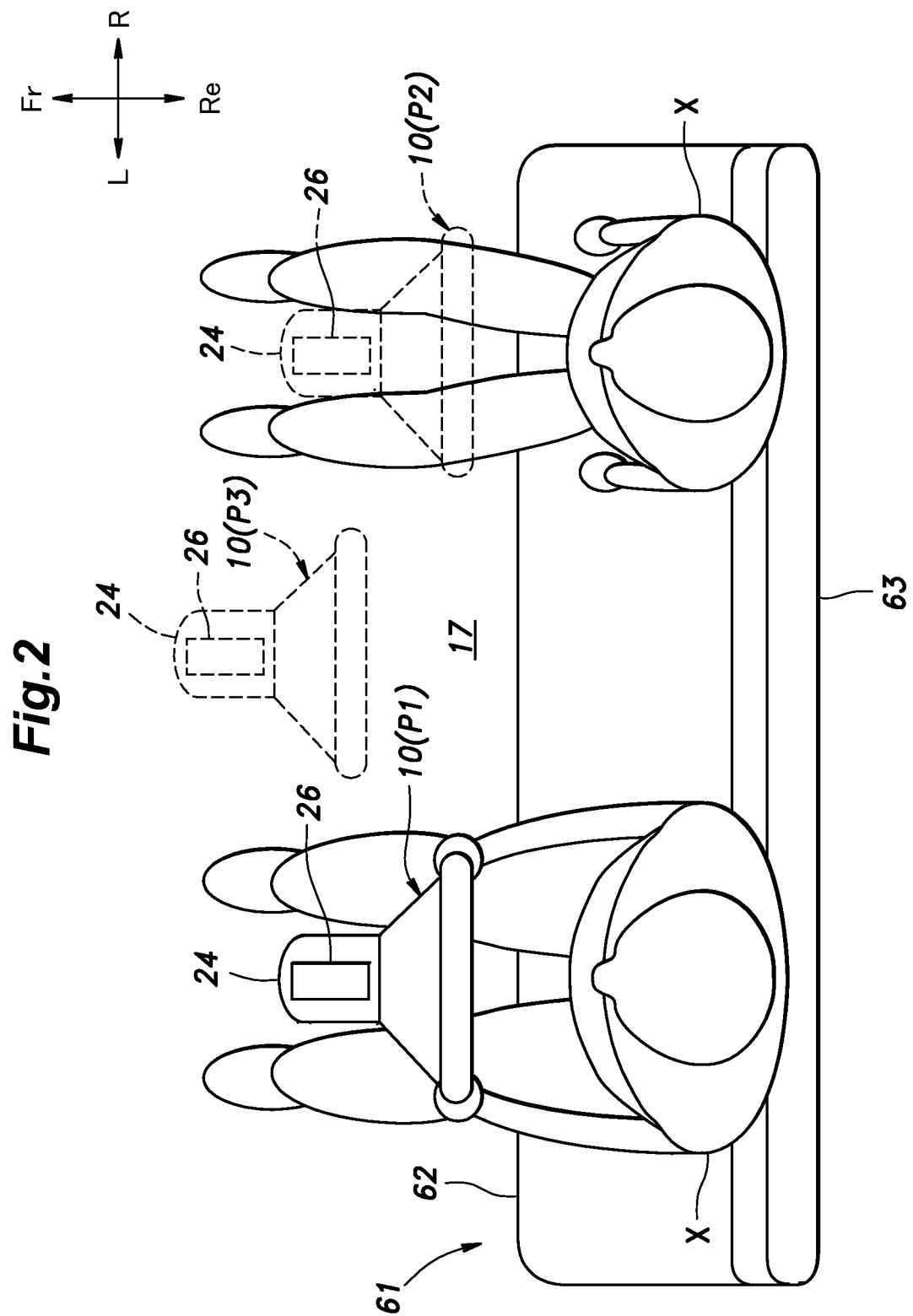
FIG. 2 is a plan view of a front part of a vehicle.
Figure 3:
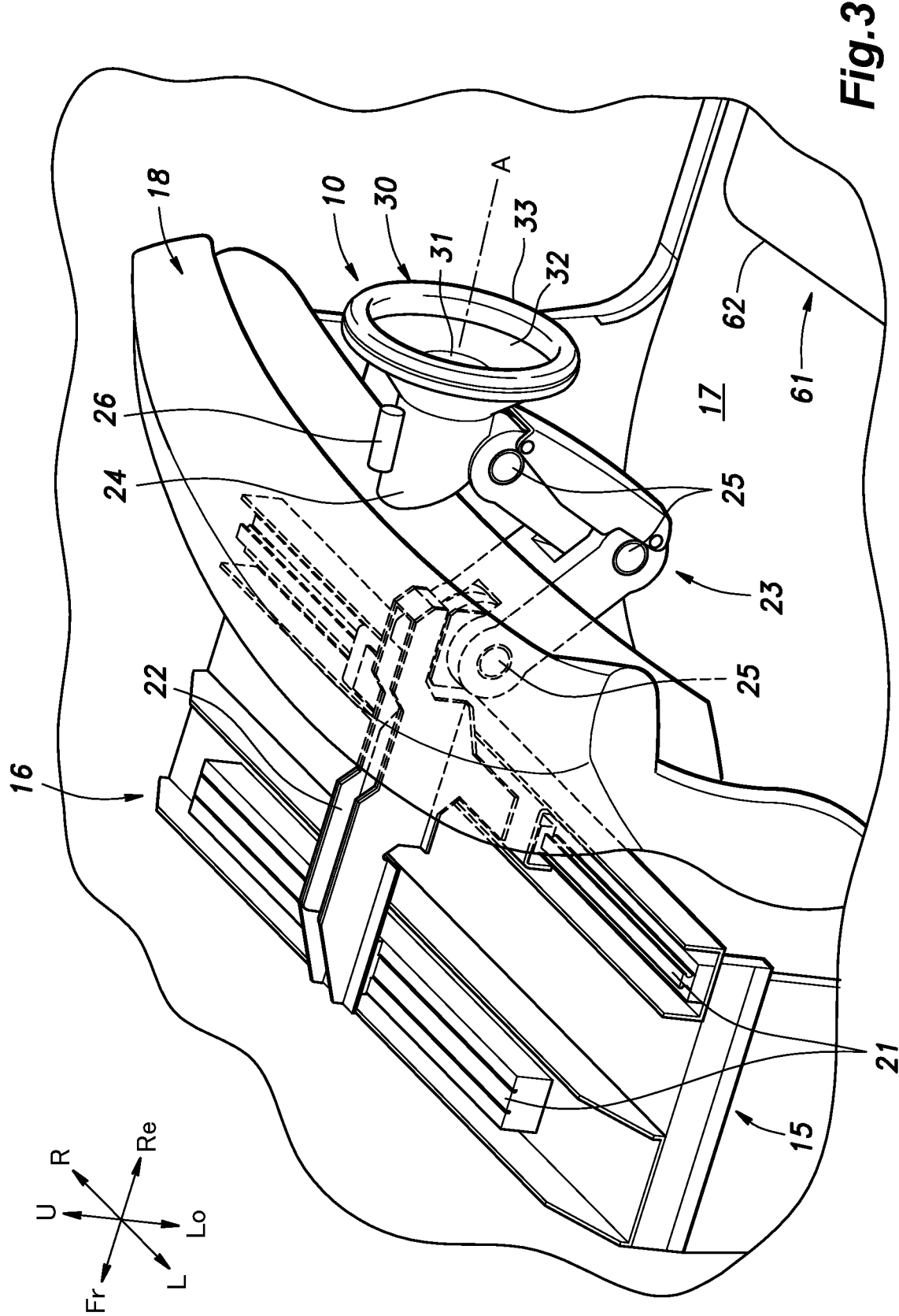
FIG. 3 is a perspective view of the front part of the vehicle.

As shown in FIGS. 2 and 3, a vehicle cabin 17 of the vehicle 2 is provided with an occupant seat 61 on which at least one occupant X (two occupants X are shown in FIG. 2) that performs the driving operation on the operation element 10 is seated. The occupant seat 61 is, for example, a bench seat having a seating space for plural persons, and extends along the lateral direction. By using such a bench seat as the occupant seat 61 in this way, a degree of flexibility in the seating position of the occupant X in the lateral direction can be increased. The occupant seat 61 is attached to a front part of a vehicle body 15 of the vehicle 2 via a base member (not shown). The occupant seat 61 includes a seat cushion 62 on which the occupant X is seated and a seat back 63 provided adjacently to the seat cushion 62 on an upper rear side thereof so as to support the occupant X from a rear side. The seat cushion 62 and the seat back 63 each have a prescribed width in the lateral direction (for example, a width for plural occupants X).

Figure 4:
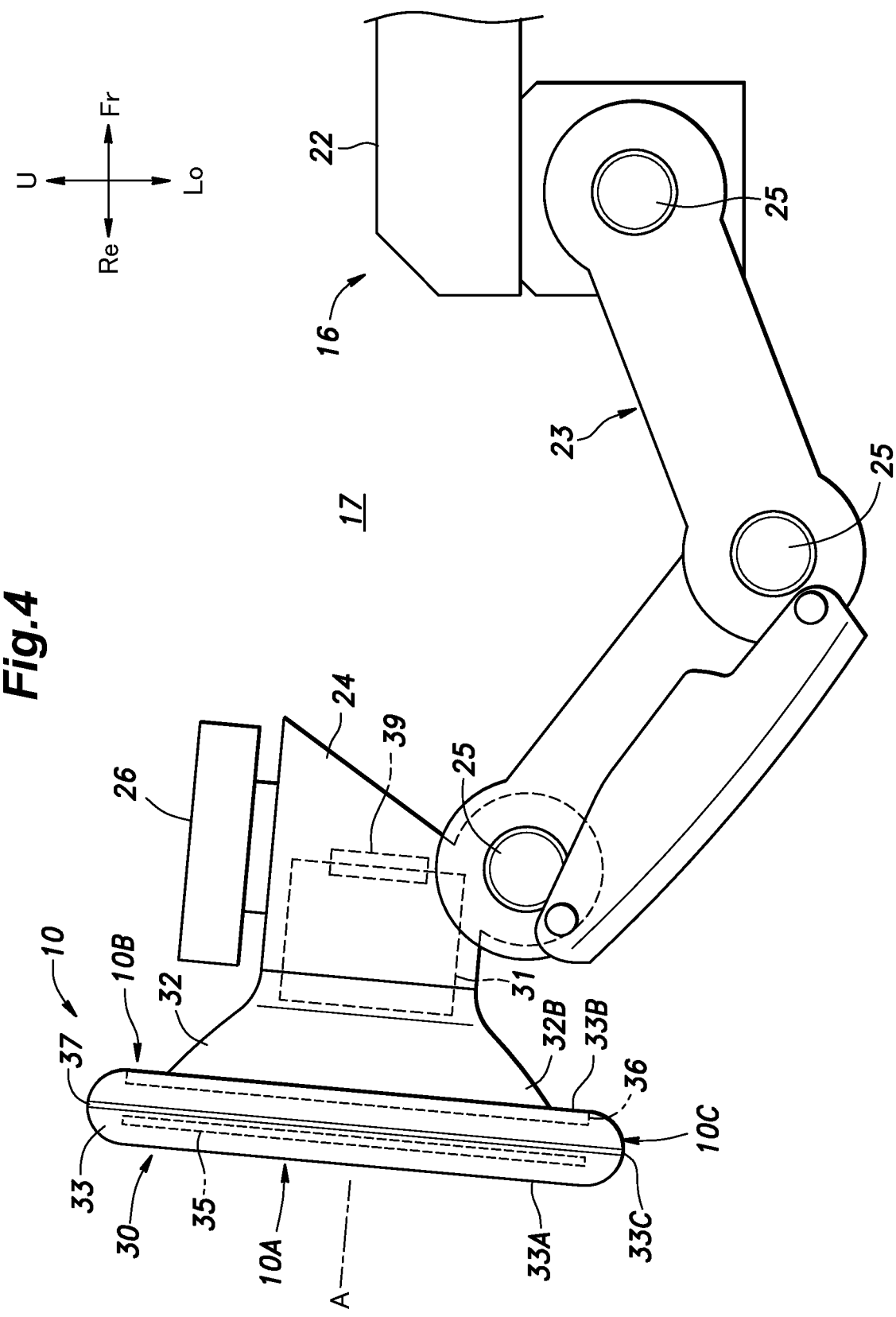
FIG. 4 is a side view of an operation element and a moving device.

As shown in FIGS. 3 and 4, the operation element 10 is supported by the front part of the vehicle body 15 via a moving device 16. The moving device 16 includes a pair of front and rear rails 21 provided on the front part of the vehicle body 15 and extending in the lateral direction, a slider 22 extending in the fore and aft direction so as to be provided between the pair of front and rear rails 21, an arm 23 extending rearward from the slider 22, and a base 24 provided at a rear end of the arm 23 and attached to the operation element 10.

The pair of front and rear rails 21 support the slider 22 such that the slider 22 is movable in the lateral direction. The pair of front and rear rails 21 and the slider 22 are provided in front of an instrument panel 18 that forms a front wall of the vehicle cabin 17 of the vehicle 2. Accordingly, the pair of front and rear rails 21 and the slider 22 are invisible or hardly seen from the occupant X in the vehicle cabin 17 of the vehicle 2, so that the design of the vehicle 2 is improved.

The arm 23 includes joints 25, and passes below the instrument panel 18 in a state where the joints 25 are bent such that the arm 23 protrudes downward. The arm 23 is stretchable in the fore and aft direction, and thereby supporting the base 24 such that the base 24 is movable in the fore and aft direction with respect to the slider 22.

An image capturing device 26 configured to capture an image of a space above the seat cushion 62 is provided on an upper surface of the base 24. The image capturing device 26 is positioned in front of the operation element 10 so as to be adjacent to the operation element 10.

As shown in FIG. 1, the moving device 16 includes a slider driving mechanism 27 and an arm driving mechanism 28. The slider driving mechanism 27 is configured to move the slider 22 in the lateral direction with respect to the rails 21 by an electric motor. Thereby, the slider 22, the arm 23, the base 24, and the operation element 10 move in the lateral direction with respect to the vehicle body 15. The arm driving mechanism 28 is configured to change a stretching degree of the arm 23 in the fore and aft direction by bending the joints 25 with an electric motor. Thereby, the base 24 and the operation element 10 move in the fore and aft direction with respect to the vehicle body 15. As described above, the moving device 16 is configured to move the operation element 10 in the lateral direction and the fore and aft direction with respect to the vehicle body 15.

The moving device 16 further includes a position sensor 29 configured to detect a position of the operation element 10 in the fore and aft direction. For example, the position sensor 29 is attached to the electric motor that forms the arm driving mechanism 28, or to one of the joints 25 of the arm 23. The position sensor 29 may be, for example, a potentiometer or a rotary encoder.

Figure 5:
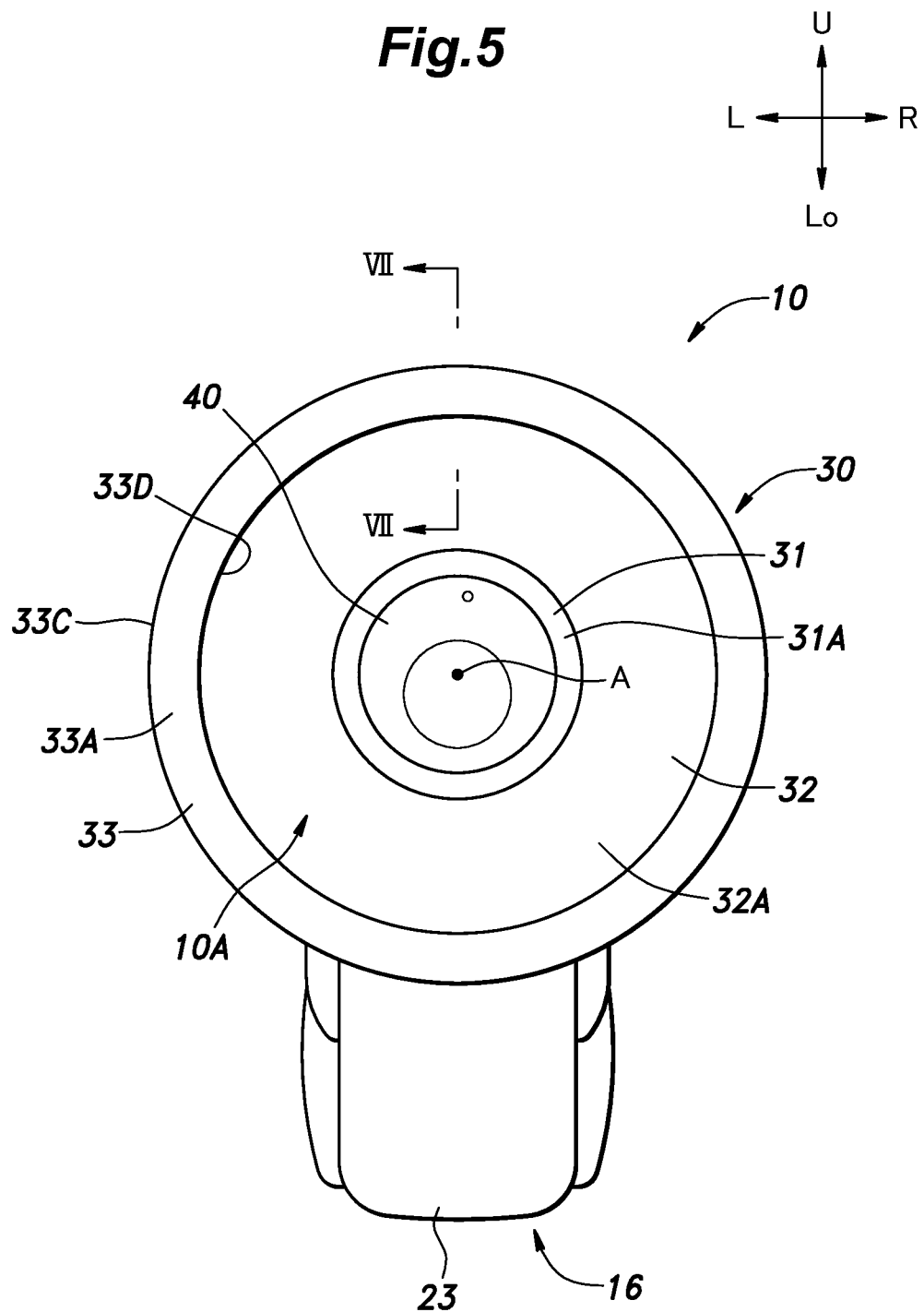
FIG. 5 is a rear view of the operation element and the moving device.

As shown in FIGS. 3 to 5, the operation element 10 includes a hub 31 provided rotatably on the base 24, a disk 32 provided coaxially with the hub 31 on an outer circumference of the hub 31, and a ring 33 provided on an outer circumference of the disk 32. The disk 32 is formed in a circular plate shape. In the present embodiment, the disk 32 extends radially outward from the hub 31 to a side opposite to the base 24 in a direction of a turning axis A of the operation element 10 (the hub 31), and is formed in a cone shape with the hub 31 on the top thereof. The ring 33 is formed in an annular shape around the turning axis A of the operation element 10 (the hub 31), and has a circular cross section. The cross-sectional diameter of the ring 33 is larger than the thickness of the disk 32. The ring 33 functions as a grip portion gripped by the occupant X to perform a turning operation on the operation element 10.

The hub 31 includes a facing part 31A facing a side of the occupant X and a back part (not shown) opposite to the facing part 31A. The disk 32 includes a facing part 32A facing the side of the occupant X and a back part 32B opposite to the facing part 32A. The ring 33 includes a facing part 33A facing the side of the occupant X, a back part 33B opposite to the facing part 33A, an outer circumferential part 33C provided on outer circumferences of the facing part 33A and the back part 33B, and an inner circumferential part 33D provided on inner circumferences of the facing part 33A and the back part 33B. More specifically, when the ring 33 is divided into two parts with a plane including an outer circumferential edge of the ring 33 (a part where the ring 33 has a maximum diameter around the turning axis A of the operation element 10) and an inner circumferential edge of the ring 33 (a part where the ring 33 has a minimum diameter around the turning axis A of the operation element 10), a part arranged on a side of the base 24 is defined as the back part 33B, while a part arranged on a side opposite to the base 24 is defined as the facing part 33A.

The operation element 10 includes a first surface part 10A, a second surface part 10B opposite to the first surface part 10A, and an outer circumferential part 10C provided on outer circumferences of the first surface part 10A and the second surface part 10B. The first surface part 10A is provided on one side along the turning axis A of the operation element 10, and forms a rear surface (one surface in the fore and aft direction) of the operation element 10. The second surface part 10B is provided on the other side along the turning axis A of the operation element 10, and forms a front surface (the other surface in the fore and aft direction) of the operation element 10. The first surface part 10A includes the facing part 31A of the hub 31, the facing part 32A of the disk 32, and the facing part 33A of the ring 33. The second surface part 10B includes the back part 32B of the disk 32 and the back part 33B of the ring 33. The outer circumferential part 10C includes the outer circumferential part 33C of the ring 33. In another embodiment, the first surface part 10A may include the back part 32B of the disk 32 and the back part 33B of the ring 33, and the second surface part 10B may include the facing part 31A of the hub 31, the facing part 32A of the disk 32, and the facing part 33A of the ring 33.

As shown in FIG. 1, the operation element 10 is provided with a first capacitive sensor 35, a second capacitive sensor 36, and third capacitive sensors 37, which function as touch sensors. The operation element 10 is also provided with a turning angle sensor 38 and a force sensor 39. The turning angle sensor 38 is configured to detect a turning angle of the operation element 10 with respect to the vehicle body 15. The turning angle sensor 38 may be a rotary encoder, a resolver, or the like. In another embodiment, the operation element 10 may be provided with a gyro sensor configured to detect the turning speed of the operation element 10.

The force sensor 39 may be a known piezoelectric sensor or a known strain gauge sensor, and is provided between the base 24 and the hub 31. The force sensor 39 is, for example, a six-axis force sensor configured to detect the loads applied to the operation element 10 to the front side along the turning axis A (one side in the fore and aft direction), to the rear side along the turning axis A (the other side in the fore and aft direction), to the left side (the first side in the lateral direction), to the right side (the second side in the lateral direction), to the upper side along a direction orthogonal to the turning axis A (one side in the up-and-down direction), and to the lower side along the direction orthogonal to the turning axis A (the other side in the up-and-down direction).

Figure 6:
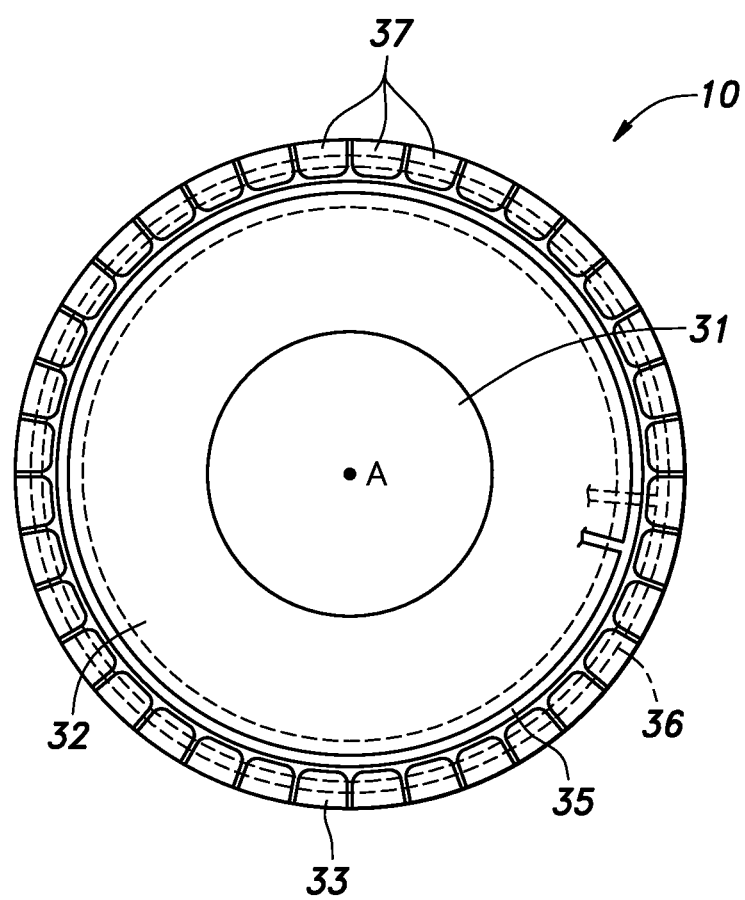
FIG. 6 is an explanatory diagram showing a positional relationship among first to third capacitive sensors provided in the operation element.
Figure 7:
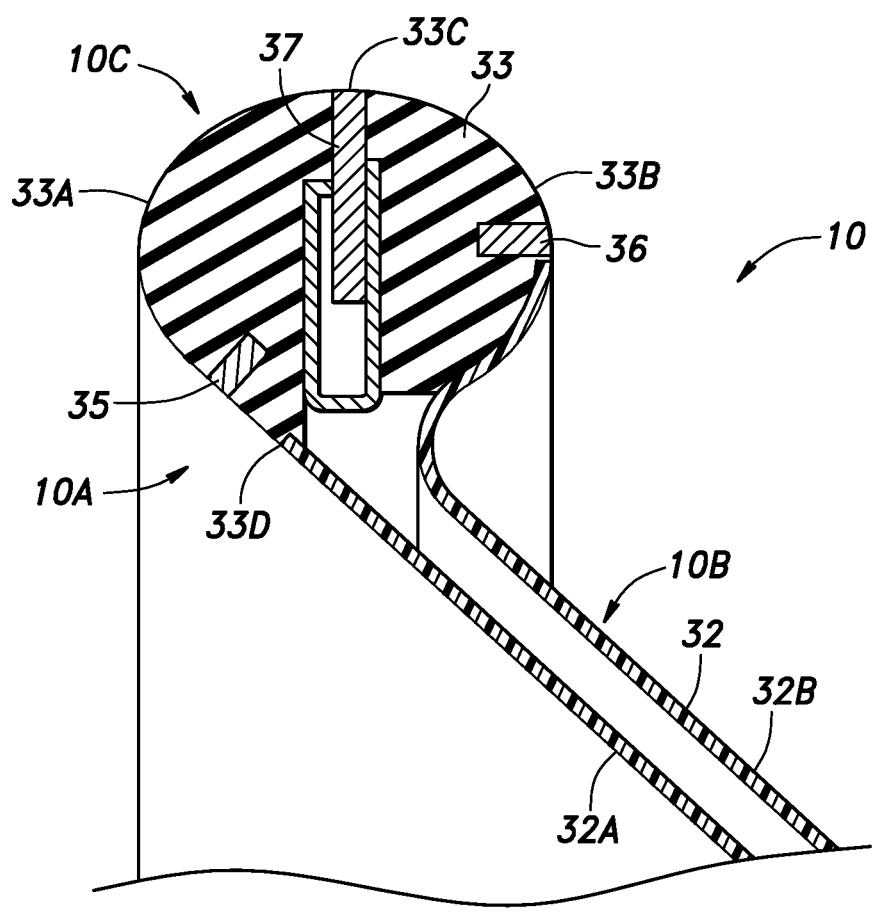
FIG. 7 is a sectional view of the operation element taken along a line VII-VII of FIG. 5.

As shown in FIGS. 4, 6, and 7, the first to third capacitive sensors 35 to 37 are touch sensors configured to detect approach and contact of an object such as the occupant X's hand (finger) according to a change in capacitance. The first to third capacitive sensors 35 to 37 are provided on the ring 33 of the operation element 10.

The first capacitive sensor 35 is provided on the first surface part 10A of the operation element 10, the second capacitive sensor 36 is provided on the second surface part 10B of the operation element 10, and the third capacitive sensors 37 are provided on the outer circumferential part 10C of the operation element 10. More specifically, the first capacitive sensor 35 is provided on the facing part 33A of the ring 33, the second capacitive sensor 36 is provided on the back part 33B of the ring 33, and the third capacitive sensors 37 are provided on the outer circumferential part 33C of the ring 33. In another embodiment, the first capacitive sensor 35 may be provided on the back part 33B of the ring 33, and the second capacitive sensor 36 may be provided on the facing part 33A of the ring 33.

The first capacitive sensor 35 is a single sensor formed in an annular shape and provided coaxially with the ring 33 along the facing part 33A of the ring 33. In another embodiment, plural first capacitive sensors 35 may be arranged in the circumferential direction along the facing part 33A of the ring 33. The first capacitive sensor 35 is preferably provided on an inner circumferential side of the facing part 33A. More specifically, when viewed in the direction along the turning axis A of the operation element 10, the first capacitive sensor 35 is preferably provided on a radially inner side with respect to a center circle that passes through a widthwise central part of the ring 33. Namely, the first capacitive sensor 35 is preferably provided on the inner circumferential part 33D of the ring 33.

The second capacitive sensor 36 is a single sensor formed in an annular shape and provided coaxially with the ring 33 along the back part 33B of the ring 33. In another embodiment, plural second capacitive sensors 36 may be arranged in the circumferential direction along the back part 33B of the ring 33. The second capacitive sensor 36 preferably extends along a widthwise central part of the back part 33B. The second capacitive sensor 36 preferably has a larger diameter than the first capacitive sensor 35.

The third capacitive sensors 37 are provided along an outer edge of the operation element 10 and configured to identify a contact position of the hand of the occupant X (a position of a contact operation by the occupant X). In another embodiment, a single third capacitive sensor 37 may extend along the outer edge of the operation element 10, or plural third capacitive sensors 37 may be divided along the outer edge of the operation element 10. In the present embodiment, the third capacitive sensors 37 are arranged in the circumferential direction along the outer circumferential part 33C of the ring 33, which includes the outer circumferential edge of the ring 33. The third capacitive sensors 37 each have the same angular length in the circumferential direction, and are arranged adjacently to each other at equal intervals. Preferably, the gaps between the adjacent third capacitive sensors 37 are as small as possible. In the present embodiment, thirty-six third capacitive sensors 37 each having an angular length of about 10 degrees are provided.

The first to third capacitive sensors 35 to 37 are configured to output signals corresponding to the capacitance thereof. The capacitance of the first to third capacitive sensors 35 to 37 increases as the object such as the occupant X's hand approaches the respective sensors 35 to 37, as the size of the approaching object increases, and as the relative permittivity of the approaching object increases.

The first to third capacitive sensors 35 to 37 function as grip sensors configured to detect that the operation element 10 is gripped by the occupant X. For example, the first to third capacitive sensors 35 to 37 detect that the operation element 10 is gripped by the occupant X if the capacitance of at least one of the first capacitive sensor 35 and the second capacitive sensor 36 has increased to a prescribed reference value or more and the capacitance of the third capacitive sensors 37 equal to or more than a prescribed number has increased to the prescribed reference value or more. In another embodiment, the first to third capacitive sensors 35 to 37 may be configured to detect that the operation element 10 is gripped by the occupant X according to a detecting method different from the above method.

As shown in FIG. 5, a display 40 as a display unit is provided on the facing part 31A of the hub 31 (a side of the occupant X of the hub 31). The display 40 is formed in a circular shape and occupies 50% or more of the area of the facing part 31A of the hub 31. As shown in FIG. 1, the display 40 is configured to be controlled by an interface control unit 41 of the control device 11, thereby displaying images indicating a driving mode (the autonomous driving mode or the manual driving mode) of the vehicle 2, a travel direction (a future trajectory) of the vehicle 2, the position of a surrounding vehicle traveling around the vehicle 2, the speed of the vehicle 2, or the like. The images displayed on the display 40 may include numerical values and symbols.

A first reaction force applying device 43 (see FIG. 1) configured to apply a reaction force (turning resistance) to the turning (or the turning operation) of the operation element 10 with respect to the vehicle body 15 is provided between the vehicle body 15 and the operation element 10. The first reaction force applying device 43 is, for example, an electric motor, and configured to apply a rotational force of the electric motor to the operation element 10 as the reaction force to the turning of the operation element 10. In the present embodiment, the first reaction force applying device 43 is provided in the base 24, and configured to apply the reaction force to the turning of the hub 31 with respect to the base 24. The first reaction force applying device 43 can restrict the turning of the operation element 10 by applying sufficient turning resistance to the operation element 10. Namely, the first reaction force applying device 43 functions as a turning restriction device configured to restrict the turning of the operation element 10 with respect to the vehicle body 15.

A second reaction force applying device 44 (see FIG. 1) configured to apply a reaction force (movement resistance) to the movement (or the moving operation) of the operation element 10 along the turning axis A with respect to the vehicle body 15 is provided between the vehicle body 15 and the operation element 10. The second reaction force applying device 44 is, for example, the electric motor that forms the arm driving mechanism 28, and configured to apply a rotational force of the electric motor to the operation element 10 as the reaction force to the movement of the operation element 10 in the fore and aft direction. The second reaction force applying device 44 can restrict the movement of the operation element 10 in the fore and aft direction by applying sufficient movement resistance to the operation element 10. Namely, the second reaction force applying device 44 functions as a movement restriction device configured to restrict the movement of the operation element 10 in the fore and aft direction with respect to the vehicle body 15.

As shown in FIG. 1, the control device 11 is connected to a vehicle sensor 45 (an example of a traveling state detecting unit) configured to detect a traveling state of the vehicle 2. The control device 11 is configured to acquire the traveling state of the vehicle 2 based on a signal from the vehicle sensor 45. For example, the vehicle sensor 45 includes a vehicle speed sensor 45A configured to detect a vehicle speed of the vehicle 2, an acceleration sensor 45B configured to detect an acceleration of the vehicle 2, a yaw rate sensor 45C configured to detect a yaw rate of the vehicle 2, a wheel speed sensor 45D configured to detect a rotation speed of each wheel 3, and a turning angle sensor 45E configured to detect a turning angle (steering angle) of each wheel 3. The turning angle sensor 45E functions as a turning state detecting unit configured to detect a turning state of the vehicle 2.

The control device 11 is connected to an external environment recognizing device 46 configured to detect a state of an external environment of the vehicle 2. The control device 11 is configured to acquire the state of the external environment of the vehicle 2 based on a signal from the external environment recognizing device 46. The external environment recognizing device 46 includes a camera 47 configured to capture an image around the vehicle 2, an object detection sensor 48 such as a laser or a lidar, and a navigation device 49 configured to acquire information about a surrounding environment of the vehicle 2. The object detection sensor 48 functions as an obstacle detecting unit configured to detect an obstacle present around the vehicle 2.

<The Driving Operation on the Operation Element 10>

The operation element 10 is configured to receive a first driving operation and a second driving operation as the driving operation. The first driving operation and the second driving operation each include an acceleration/deceleration operation and a steering operation different from each other. The first driving operation is a driving operation performed by touching the operation element 10 (for example, a single tap operation, a double tap operation, a long press operation, and a stroke operation). Accordingly, the movable amount of the operation element 10 according to the first driving operation is zero or extremely small. The second driving operation is a driving operation performed by turning or moving the operation element 10. Accordingly, the movable amount of the operation element 10 according to the second driving operation is larger than that of the operation element 10 according to the first driving operation. In this way, the first driving operation is a contact operation on the operation element 10, while the second driving operation is a turning operation or a moving operation on the operation element 10. Accordingly, it is possible to clearly distinguish the first driving operation and the second driving operation and avoid confusion between the two.

The first driving operation includes a stroke operation in the circumferential direction on the outer circumferential part 33C of the ring 33 by the hand of the occupant X. When the hand of the occupant X strokes the outer circumferential part 33C of the ring 33 in the circumferential direction, the capacitance of the third capacitive sensors 37 arranged in the circumferential direction changes sequentially. The signal processing unit 14 detects the stroke operation on the ring 33 by the occupant X based on the signals from the third capacitive sensors 37. Also, the signal processing unit 14 detects the direction and the length (stroke length) of the stroke operation based on the signals from the third capacitive sensors 37. The travel control unit 12 may control the steering device 4 according to the direction and the length of the stroke operation detected by the signal processing unit 14, thereby moving (offsetting) the vehicle 2 in the vehicle width direction, changing the lanes, and turning the vehicle 2 right or left.

Further, the first driving operation includes the contact operation on the facing part 33A or the back part 33B of the ring 33 by the occupant X. The contact operation includes, for example, a single tap operation, a double tap operation, and a long press operation. When the hand of the occupant X performs the contact operation on the facing part 33A or the back part 33B of the ring 33, the capacitance of the first capacitive sensor 35 or the second capacitive sensor 36 changes. The signal processing unit 14 determines the contact duration and the contact number of the hand of the occupant X based on the detection signal from the first capacitive sensor 35 or the second capacitive sensor 36, thereby determining whether the contact operation is either of a single tap operation, a double tap operation, and a long press operation.

For example, the travel control unit 12 executes the acceleration control in response to the operation on the facing part 33A, and executes the deceleration control in response to the operation on the back part 33B. The acceleration control includes the control to increase the target speed of the vehicle 2 by a predetermined value from the current value, the control to decrease the target vehicle-to-vehicle distance (namely, the distance between the vehicle 2

(namely, the own vehicle) and the preceding vehicle traveling in front of the vehicle 2) by a predetermined value from the current value, and the control to start the movement of the vehicle 2 from a state where the vehicle 2 is stopped. The deceleration control includes the control to decrease the target speed of the vehicle 2 by a predetermined value from the current value, the control to increase the target vehicle-to-vehicle distance by a predetermined value from the current value, and the control to stop the vehicle 2 from a state where the vehicle 2 is traveling at low speed. The travel control unit 12 may change the control to execute or the changing amount of the target speed of the vehicle 2 according to the mode of the operation on the facing part 33A or the back part 33B. For example, the travel control unit 12 may make the changing amount of the target speed of the vehicle 2 in response to a double tap operation larger than that of the target speed of the vehicle 2 in response to a single tap operation. Also, the travel control unit 12 may keep on increasing or decreasing the target speed of the vehicle 2 while a long press operation is being performed on the facing part 33A or the back part 33B.

The second driving operation includes the turning operation on the operation element 10 around the turning axis A and the moving operation (push/pull operation) on the operation element 10 along the turning axis A. When the occupant X performs the turning operation on the operation element 10, the turning angle sensor 38 detects the turning angle of the operation element 10 with respect to the vehicle body 15. The signal processing unit 14 acquires the turning angle of the operation element 10 based on the detection signal from the turning angle sensor 38, and the travel control unit 12 controls the steering device 4 according to the acquired turning angle, thereby turning (steering) the wheels 3 of the vehicle 2.

When the occupant X performs the moving operation on the operation element 10 to the front side (namely, when the occupant X pushes the operation element 10), the force sensor 39 detects the load applied to the operation element 10 to the front side. The signal processing unit 14 acquires the load applied to the operation element 10 and the direction of the load based on the detection signal from the force sensor 39, and the travel control unit 12 controls the drive device 5 according to the acquired load and the acquired direction of the load, thereby accelerating the vehicle 2. When the occupant X performs the moving operation on the operation element 10 to the rear side (namely, when the occupant X pulls the operation element 10), the force sensor 39 detects the load applied to the operation element 10 to the rear side. The signal processing unit 14 acquires the load applied to the operation element 10 and the direction of the load based on the detection signal from the force sensor 39, and the travel control unit 12 controls at least one of the drive device 5 and the brake device 6 according to the acquired load and the acquired direction of the load, thereby decelerating the vehicle 2. In another embodiment, the position sensor 29 may detect the moving operation on the operation element 10 by the occupant X, and the travel control unit 12 may execute the acceleration/deceleration control of the vehicle 2 based on the signal from the position sensor 29.

<The Driving Mode of the Vehicle 2>

The travel control unit 12 is configured to switch the driving mode of the vehicle 2 between the autonomous driving mode and the manual driving mode. In the autonomous driving mode, the travel control unit 12 automatically executes the steering operation and the acceleration/deceleration operation. In the manual driving mode, the occupant X manually performs the steering operation and the acceleration/deceleration operation.

In the autonomous driving mode, the travel control unit 12 independently creates a future trajectory of the vehicle 2, thereby controlling the steering device 4, the drive device 5, and the brake device 6. However, even in the autonomous driving mode, the travel control unit 12 receives the first driving operation on the operation element 10 by the occupant X, thereby causing the control of the steering device 4, the drive device 5, and the brake device 6 to reflect the intention of the occupant X. That is, the first driving operation is an auxiliary driving operation in the autonomous driving mode.

In the manual driving mode, the travel control unit 12 controls the steering device 4, the drive device 5, and the brake device 6 according to the second driving operation on the operation element 10 by the occupant X. That is, the second driving operation is an independent driving operation in the manual driving mode. In another embodiment, in the manual driving mode, the travel control unit 12 may control the drive device 5 and the brake device 6 according to a pressing operation on an accelerator pedal or a brake pedal by the occupant X.

<The Position of the Operation Element 10>

With reference to FIG. 2, the operation element 10 is movable among a first position P1 as an allowance position, a second position P2 as an allowance position, and a third position P3 as a restriction position. The first position P1 is located on the left side (the first side in the lateral direction) with respect to the center of the vehicle 2 in the lateral direction, and the second position P2 is located on the right side (the second side in the lateral direction) with respect to the center of the vehicle 2 in the lateral direction. That is, the first position P1 and the second position P2 are offset from each other in the lateral direction and separated from each other. The third position P3 is located at the center of the vehicle 2 in the lateral direction. The third position P3 is located between the first position P1 and the second position P2 in the lateral direction (more specifically, located in the middle of the first position P1 and the second position P2 in the lateral direction), and is offset from the first position P1 and the second position P2 in the lateral direction. The third position P3 is located more forward than the first position P1 and the second position P2 in the fore and aft direction. Accordingly, when the occupant X does not operate the operation element 10 (for example, when the autonomous driving mode is executed or when the occupant X gets on or off the vehicle 2), the operation element 10 is moved to the third position P3, so that the operation element 10 and the occupant X can be separated from each other. Accordingly, it is possible to prevent the operation element 10 from oppressing the occupant X.

In a state where the operation element 10 is located in the first position P1 or the second position P2, the vehicle 2 can travel in the autonomous driving mode and the manual driving mode. More specifically, in a state where the operation element 10 is located in the first position P1 or the second position P2, the travel control unit 12 switches the driving mode of the vehicle 2 between the manual driving mode and the autonomous driving mode according to an operation on a mode change switch 51 (see FIG. 1) by the occupant X. In a state where the operation element 10 is located in the third position P3, the vehicle 2 can travel only in the autonomous driving mode, and the manual driving mode cannot be selected. In a state where the operation element 10 is located between the first position P1 and the third position P3 or between the second position P2 and the third position P3, the vehicle 2 can travel only in the autonomous driving mode, and the manual driving mode cannot be selected.

In a state where the operation element 10 is located in the first position P1 or the second position P2, the operation element 10 can receive both the first driving operation and the second driving operation. More specifically, in a state where the operation element 10 is located in the first position P1 or the second position P2 and the driving mode of the vehicle 2 is set to the autonomous driving mode, the operation element 10 can receive the first driving operation. On the other hand, in a state where the operation element 10 is located in the first position P1 or the second position P2 and the driving mode of the vehicle 2 is set to the manual driving mode, the operation element 10 can receive the second driving operation.

In a state where the operation element 10 is located in the third position P3, between the first position P1 and the third position P3, or between the second position P2 and the third position P3, the driving mode of the vehicle 2 is set to the autonomous driving mode, and the operation element 10 can receive the first driving operation and cannot receive the second driving operation. Thus, in the third position P3 where the operation element 10 and the occupant X are separated from each other, it is possible to prevent the execution of the second driving operation, which makes the movable amount of the operation element 10 relatively large. Accordingly, it is possible to prevent an erroneous operation on the operation element 10 located in the third position P3.

<The Generation of the Turning Lines XR, XL>

With reference to FIG. 1, the control device 11 includes a generating unit 71. With reference to FIGS. 8A to 8C, the generating unit 71 is configured to generate turning lines XR, XL toward the front of the vehicle 2 in the traveling direction thereof based on the signal from the vehicle sensor 45. Each turning line XR, XL indicates a prospective turning trajectory of the vehicle 2. For example, the generating unit 71 is configured to generate each turning line XR, XL based on a minimum turning radius (namely, a minimum radius with which the vehicle 2 can turn stably). In another embodiment, the generating unit 71 may be configured to generate each turning line XR, XL based on a turning radius larger than the minimum turning radius (for example, a turning radius acquired by adding a prescribed margin to the minimum turning radius).

The generating unit 71 is configured to respectively generate a right turning line XR and a left turning line XL. The right turning line XR is the turning line to the right, and the left turning line XL is the turning line to the left. The generating unit 71 is configured to generate the right turning line XR and the left turning line XL from the lateral center of the vehicle 2 (see FIG. 8A). In another embodiment, the generating unit 71 may be configured to generate the right turning line XR from a left end of the vehicle 2 and to generate the left turning line XL from a right end of the vehicle 2 (see FIG. 8B). Namely, the generating unit 71 may be configured to generate the right turning line XR and the left turning line XL from the same starting point or from different starting points.

The generating unit 71 is configured to generate each turning line XR, XL by using a clothoid curve such that the curvature of each turning line XR, XL increases toward the front in the traveling direction of the vehicle 2. Thus, it is possible to appropriately generate each turning line XR, XL according to prospective changes in the turning angle of each wheel 3 and the vehicle speed of the vehicle 2 after the driving mode is switched from the manual driving mode to the autonomous driving mode. In another embodiment, the generating unit 71 may be configured to generate each turning line XR, XL by using a vehicle motion model such as a two-wheel model or its approximate function instead of the clothoid curve. Also, in another embodiment, the generating unit 71 may generate each turning line XR, XL by using a curve with constant curvature or by combining the clothoid curve and the curve with constant curvature. For example, the generating unit 71 may generate a proximal portion (a portion on a side of the starting point) of each turning line XR, XL by using the clothoid curve and generate a distal portion (a portion on a side of the end point) of each turning line XR, XL by using the curve with constant curvature.

As described in detail below, the generating unit 71 is configured to change the degree of curvature (hereinafter referred to as "curvature degree") of each turning line XR, XL based on the vehicle speed of the vehicle 2, the friction coefficient (hereinafter referred to as "road friction coefficient") between each wheel 3 and a road (namely, a road surface), the vehicle weight of the vehicle 2, and the motion state of the vehicle 2 (for example, the yaw rate of the vehicle 2 or the turning angle of each wheel 3). The above-mentioned curvature degree of each turning line XR, XL represents the magnitude of curvature (bend) of each turning line XR, XL with respect to the vehicle length direction. For example, in FIG. 8A, the curvature degree of each turning line XR, XL shown by a two-dot chain line is larger than that of each turning line XR, XL shown by a one-dot chain line. As a result, the length L2 (the length in the vehicle length direction) of each turning line XR, XL shown by the two-dot chain line is shorter than the length L1 (the length in the vehicle length direction) of each turning line XR, XL shown by the one-dot chain line. The generating unit 71 is configured to determine a direction to generate each turning line XR, XL based on the above-mentioned motion state of the vehicle 2 (for example, the yaw rate of the vehicle 2 or the turning angle of each wheel 3).

The generating unit 71 is configured to acquire the vehicle speed of the vehicle 2 based on a signal from the vehicle speed sensor 45A. As the vehicle speed of the vehicle 2 increases, it gets harder for the vehicle 2 to make a small turn. Considering this point, the generating unit 71 is configured to decrease the curvature degree of each turning line XR, XL as the vehicle speed of the vehicle 2 increases. For example, the generating unit 71 sets the curvature degree of each turning line XR, XL lower in a case where the vehicle speed of the vehicle 2 is S1, as compared with a case where the vehicle speed of the vehicle 2 is S2 (S2<S1). Thus, it is possible to appropriately generate each turning line XR, XL according to the vehicle speed of the vehicle 2. In another embodiment, the generating unit 71 may be configured to change the curvature degree of each turning line XR, XL based on a signal from another sensor (a sensor other than the vehicle speed sensor 45A) included in the vehicle sensor 45.

The generating unit 71 is configured to calculate a speed difference between the wheels 3 (between front wheels and rear wheels) based on a signal from the wheel speed sensor 45D and to estimate the road friction coefficient based on the speed difference between the wheels 3. As the road friction coefficient increases, it gets easier for the vehicle 2 to turn stably. Considering this point, the generating unit 71 is configured to increase the curvature degree of each turning line XR, XL as the road friction coefficient increases. For example, the generating unit 71 sets the curvature degree of each turning line XR, XL higher in a case where the road friction coefficient is as compared with a case where the road friction coefficient is $\mu 2$ ($\mu 2 < \mu 1$). Thus, it is possible to appropriately generate each turning line XR, XL according to the road friction coefficient.

The generating unit 71 is configured to acquire the vehicle weight of the vehicle 2 based on the vehicle data stored in a storage unit (not shown). As the vehicle weight of the vehicle 2 increases, it gets harder for the vehicle 2 to make a small turn. Considering this point, the generating unit 71 is configured to decrease the curvature degree of each turning line XR, XL as the vehicle weight of the vehicle 2 increases. For example, the generating unit 71 sets the curvature degree of each turning line XR, XL lower in a case where the vehicle weight of the vehicle 2 is W1, as compared with a case where the vehicle weight of the vehicle 2 is W2 (W2<W1). Thus, it is possible to appropriately generate each turning line XR, XL according to the vehicle weight of the vehicle 2.

The generating unit 71 is configured to acquire the turning angle of each wheel 3 based on a signal from the turning angle sensor 45E. The generating unit 71 is configured to correct each turning line XR, XL based on the turning angle of each wheel 3. For example, in a case where the vehicle 2 is turned to the left to reach the current position, the generating unit 71 acquires the turning angle of each wheel 3 directed leftward with respect to a reference angle (an angle at which the vehicle 2 travels straight). In such a case, it is easy for the vehicle 2 to turn to the left, while it is hard for the vehicle 2 to turn to the right. Accordingly, the generating unit 71 corrects each turning line XR, XL such that the curvature degree of the left turning line XL is higher than that of the right turning line XR (see FIG. 8C). Further, the generating unit 71 corrects each turning line XR, XL on or after a reaching time (a time when the turning angle of each wheel 3 is estimated to reach the maximum value) such that each turning line XR, XL corresponds to a prospective trajectory at a time when the turning angle of each wheel 3 is constant. Accordingly, it is possible to appropriately generate each turning line XR, XL according to the turning state of the vehicle 2. In another embodiment, the generating unit 71 may acquire the turning angle of the operation element 10 based on the signal from the turning angle sensor 38 and correct each turning line XR, XL based on the turning angle of the operation element 10. Namely, in another embodiment, the turning angle sensor 38 may be used as the turning state detecting unit.

With reference to FIG. 9, the generating unit 71 may generate each turning line XR, XL by using a turning radius table that shows a turning radius in a steady state (hereinafter referred to as "steady turning radius"). The turning radius table is a table showing the steady turning radius of the vehicle 2 corresponding to the vehicle speed and the steering angle (the turning angle of the operation element 10) of the vehicle 2. The steady turning radius is a radius of a circular trajectory at a time when the vehicle 2 makes a steady turn while the vehicle speed and the steering angle of the vehicle 2 are constant. In another embodiment, the turning radius table may be a table showing the steady turning radius of the vehicle 2 according to the vehicle speed of the vehicle 2 and the motion state of the vehicle 2 (for example, the yaw rate of the vehicle 2).

For example, the generating unit 71 acquires the vehicle speed (current value) of the vehicle 2 based on the signal from the vehicle speed sensor 45A and acquires the steering angle (current value) based on the signal from the turning angle sensor 38. Next, the generating unit 71 estimates the vehicle speed (future value) of the vehicle 2 based on the vehicle speed (current value) of the vehicle 2 and estimates the steering angle (future value) based on the steering angle (current value). Next, the generating unit 71 acquires the steady turning radius (current value and future value) of the vehicle 2 by referring to the turning radius table based on the vehicle speed (current value and future value) and the steering angle (current value and future value) of the vehicle 2. Then, the generating unit 71 generates each turning line XR, XL based on the acquired steady turning radius (current value and future value) of the vehicle 2. Accordingly, it is possible to acquire a dynamically stable trajectory of the vehicle 2.

<The Setting of the Traveling Area Y>

Figure 10A:
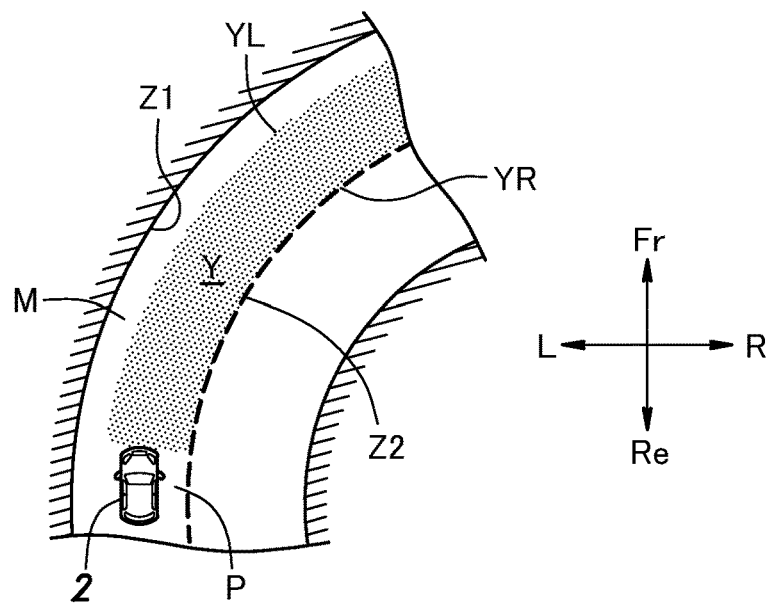
FIG. 10A is a plan view illustrating how to set traveling areas according to one suitable embodiment.
Figure 10B:
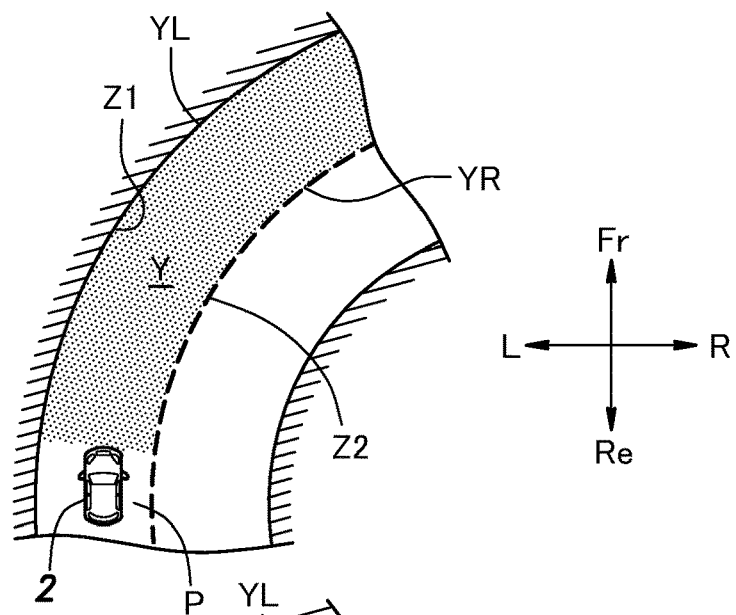
FIG. 10B is a plan view illustrating how to set traveling areas accordingly to another suitable embodiment.
Figure 10C:
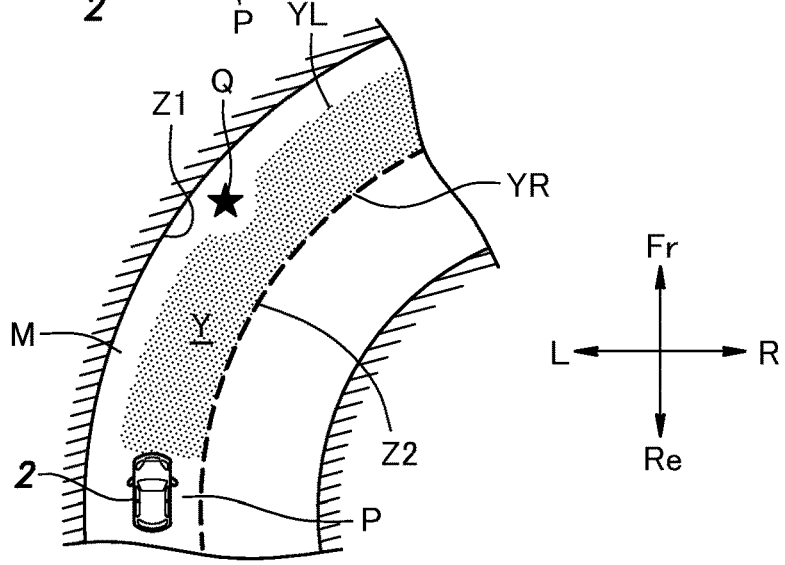
FIG. 10C is a plan view illustrating how to set traveling areas when an obstacle is present.

With reference to FIG. 1, the control device 11 includes a setting unit 72. With reference to FIGS. 10A to 10C, the setting unit 72 is configured to set a traveling area Y, which is provided with many dots in FIGS. 10A to 10C, in front of the vehicle 2 in the traveling direction thereof based on the signal from the external environment recognizing device 46. The traveling area Y is an area in which the vehicle 2 should travel.

The setting unit 72 is configured to recognize a traveling path P on which the vehicle 2 is traveling based on a signal from the camera 47. For example, the setting unit 72 is configured to extract a pair of traveling path boundaries Z1 and Z2 (a traveling path boundary Z1 located on an outside in the vehicle width direction and a traveling path boundary Z2 located on an inside in the vehicle width direction) based on boundary objects (for example, guardrails or plants) or lane markers (for example, white lines or marking lines) included in an image captured by the camera 47. The setting unit 72 is configured to recognize an area between the pair of traveling path boundaries Z1 and Z2 as the traveling path P.

The setting unit 72 is configured to set a partial area in the vehicle width direction (for example, an area excluding an outside area M in the vehicle width direction) of the traveling path P to the traveling area Y (see FIG. 10A). In a case where the generating unit 71 generates each turning line XR, XL from the left and right ends of the vehicle 2 (see FIG. 8B), the setting unit 72 may set the entire area in the vehicle width direction of the traveling path P to the traveling area Y (see FIG. 10B).

With reference to FIG. 10C, the setting unit 72 is configured to recognize an obstacle Q (for example, another vehicle or a fallen object) present around the vehicle 2 based on a signal from the object detection sensor 48. The setting unit 72 is configured to set the traveling area Y such that the traveling area Y avoids the obstacle Q in a case where the obstacle Q is present in the traveling path P. Thus, it is possible to appropriately set the traveling area Y in consideration of the obstacle Q.

<The Determination by Using Each Turning Line XR, XL>

With reference to FIG. 1, the control device 11 includes a determining unit 73. The determining unit 73 is configured to determine whether each turning line XR, XL is located in the traveling area Y. For example, this determination is made at regular time intervals or at regular distance intervals.

Figure 11A:
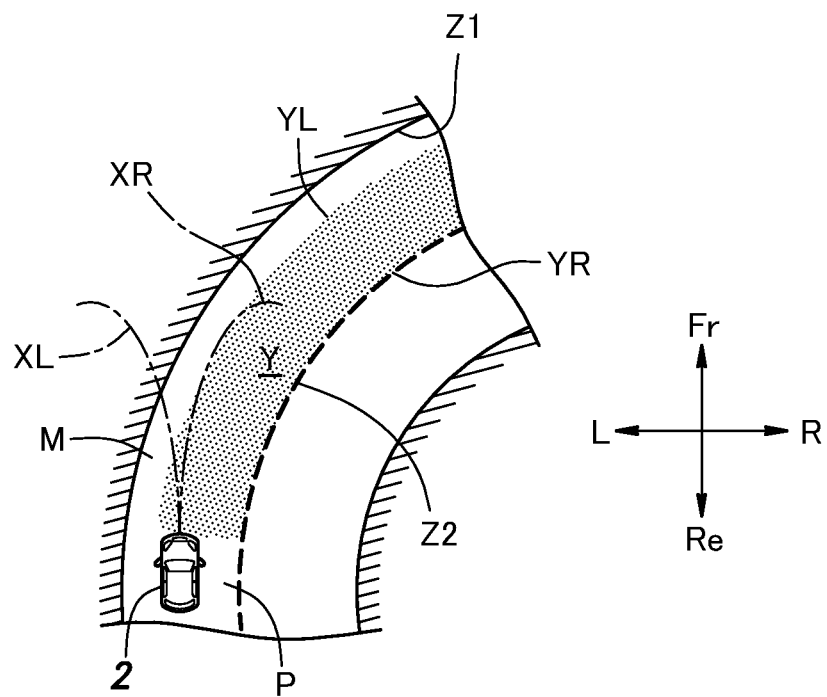
FIG. 11A is a plan view illustrating how to make a determination by using the turning lines.

With reference to FIG. 11A, the determining unit 73 compares the right turning line XR with a left edge YL of the traveling area Y and thus determines whether the right turning line XR is located in the traveling area Y in a case where the vehicle 2 approaches the left edge YL of the traveling area Y (namely, in a case where the vehicle 2 gets closer to the left edge YL than the right edge YR). The determining unit 73 does not determine whether the left turning line XL is located in the traveling area Y in a case where the vehicle 2 approaches the left edge YL of the traveling area Y.

Figure 11B:
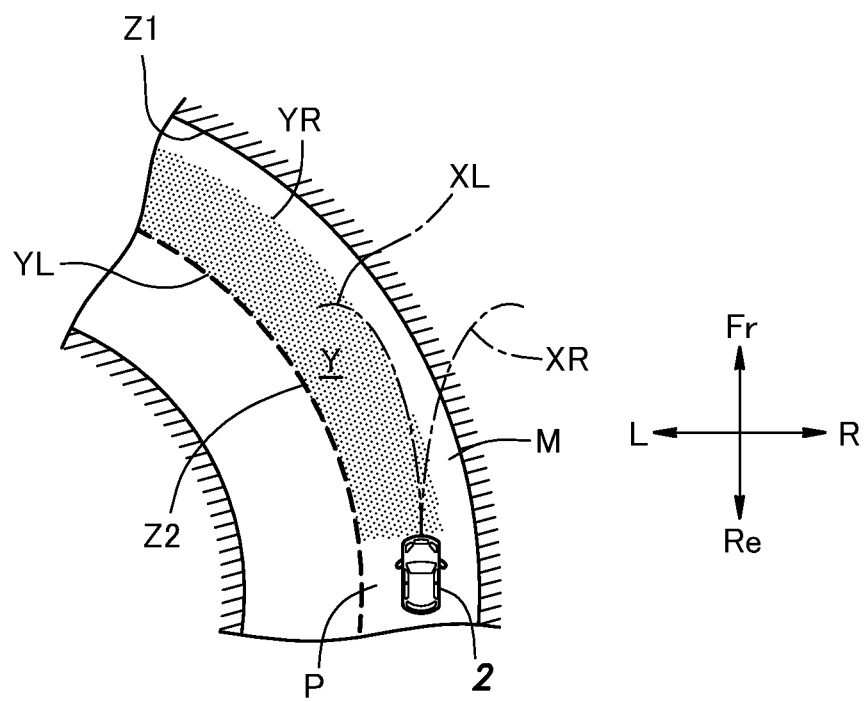
FIG. 11B is another plan view illustrating how to make a determination by using the turning lines.

With reference to FIG. 11B, the determining unit 73 compares the left turning line XL with a right edge YR of the traveling area Y and thus determines whether the left turning line XL is located in the traveling area Y in a case where the vehicle 2 approaches the right edge YR of the traveling area Y (namely, in a case where the vehicle 2 gets closer to the right edge YR than the left edge YL). The determining unit 73 does not determine whether the right turning line XR is located in the traveling area Y in a case where the vehicle 2 approaches the right edge YR of the traveling area Y.

In this way, the determining unit 73 determines only whether one of the turning lines XR, XL is located in the traveling area Y according to a direction in which the vehicle 2 is estimated to deviate from the traveling area Y. Thus, it is possible to appropriately determine whether each turning line XR, XL is located in the traveling area Y, and thus to prevent the driving mode from being excessively switched from the manual driving mode to the autonomous driving mode. Further, the determining unit 73 can reduce the load of a determination process by determining only whether one of the turning lines XR, XL is located in the traveling area Y, as compared with a case where the determining unit 73 determines whether both the turning lines XR, XL are located in the traveling area Y.

<The Turns of the Vehicle 2>

Figure 12:
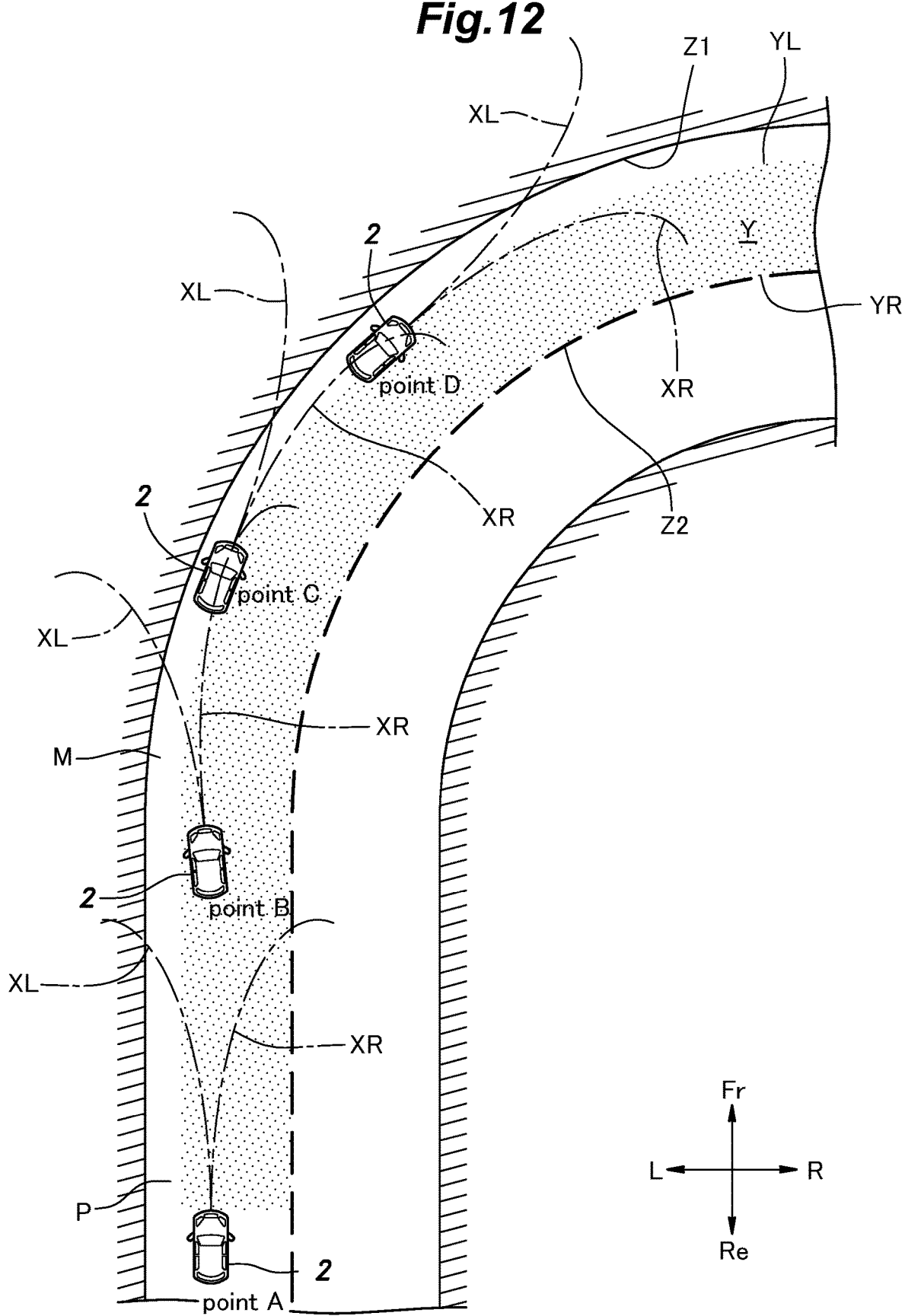
FIG. 12 is a plan view illustrating how the vehicle turns.

Next, turns of the vehicle 2 will be described with reference to FIG. 12. The turns of the vehicle 2 include a turn to the right and a turn to the left. In the following, only the turn to the right of the vehicle 2 will be described, and the description of the turn to the left of the vehicle 2 will be omitted.

When the vehicle 2 is traveling at a point A, the travel control unit 12 selects the manual driving mode and the vehicle 2 approaches the left edge YL of the traveling area Y. Accordingly, the generating unit 71 generates each turning line XR, XL, and the determining unit 73 determines whether the right turning line XR is located in the traveling area Y. At the point A, the entire right turning line XR is located on a right side (an inside in the lateral direction) of the left edge YL of the traveling area Y. Accordingly, the determining unit 73 determines that the right turning line XR is located in the traveling area Y. In this case, the travel control unit 12 maintains the driving mode of the vehicle 2 in the manual driving mode and controls the steering device 4 so as to turn each wheel 3 in response to the turning operation on the operation element 10 by the occupant X.

When the vehicle 2 is traveling at a point B, the travel control unit 12 selects the manual driving mode and the vehicle 2 approaches the left edge YL of the traveling area Y. Accordingly, the generating unit 71 generates each turning line XR, XL, and the determining unit 73 determines whether the right turning line XR is located in the traveling area Y. At the point B, a part of the right turning line XR protrudes to a left side (an outside in the lateral direction) from the left edge YL of the traveling area Y. Accordingly, the determining unit 73 determines that the right turning line XR is not located in the traveling area Y. Thus, the travel control unit 12 switches the driving mode of the vehicle 2 from the manual driving mode to the autonomous driving mode and controls the steering device 4 such that the vehicle 2 turns along the right turning line XR. Incidentally, the travel control unit 12 may decelerate the vehicle 2 after switching the driving mode of the vehicle 2 from the manual driving mode to the autonomous driving mode.

As described above, when the vehicle 2 is traveling at the point B, the determining unit 73 determines that the right turning line XR is not located in the traveling area Y. Accordingly, the first reaction force applying device 43 increases the reaction force to the turning operation on the operation element 10 in a direction (hereinafter referred to as "deviation increasing direction") to increase the deviation of the vehicle 2 from the traveling area Y. Thus, the turning operation on the operation element 10 becomes impossible, or the force required for the turning operation on the operation element 10 becomes very large. Accordingly, it is possible to make the occupant aware that it becomes difficult to turn each wheel 3 in response to the turning operation on the operation element 10.

In another embodiment, in a case where the determining unit 73 determines that the right turning line XR is not located in the traveling area Y, the travel control unit 12 may not transmit a control signal (more specifically, a control signal corresponding to the turning operation on the operation element 10) to the steering device 4 even when the operation element 10 receives the turning operation. Accordingly, by using a simple configuration, it is possible to prevent each wheel 3 from being turned in the deviation increasing direction in response to the turning operation on the operation element 10. Further, since the turning operation on the operation element 10 is not suppressed, the vehicle 2 can be turned without making the occupant X aware that it becomes difficult to turn each wheel 3 in response to the turning operation on the operation element 10.

As described above, when the vehicle 2 is traveling at the point B, the determining unit 73 determines that the right turning line XR is not located in the traveling area Y. Accordingly, the operation element 10 issues a warning indicating that the turning operation on the operation element 10 in the deviation increasing direction is prohibited. For example, the operation element 10 issues the warning by lighting or blinking the display 40. Thus, it is possible to prevent the occupant X from continuing the turning operation on the operation element 10 in the deviation increasing direction even though it becomes difficult to turn each wheel 3 in response to the turning operation on the operation element 10. In another embodiment, the operation element 10 may issue the warning by lighting or blinking the ring 33.

When the vehicle 2 is traveling at a point C, the travel control unit 12 selects the autonomous driving mode and the vehicle 2 approaches the left edge YL of the traveling area Y. Accordingly, the generating unit 71 generates each turning line XR, XL and the determining unit 73 determines whether the right turning line XR is located in the traveling area Y. At the point C, a part of the right turning line XR still protrudes to the left side (the outside in the lateral direction) from the left edge YL of the traveling area Y. Accordingly, the determining unit 73 determines that the right turning line XR is not located in the traveling area Y. In this case, the travel control unit 12 maintains the driving mode of the vehicle 2 in the autonomous driving mode and controls the steering device 4 such that the vehicle 2 turns along the right turning line XR.

When the vehicle 2 is traveling at a point D, the travel control unit 12 selects the autonomous driving mode and the vehicle 2 approaches the left edge YL of the traveling area Y. Accordingly, the generating unit 71 generates each turning line XR, XL, and the determining unit 73 determines whether the right turning line XR is located in the traveling area Y. At the point D, the entire right turning line XR is located on the right side (the inside in the lateral direction)

of the left edge YL of the traveling area Y. Accordingly, the determining unit 73 determines that the right turning line XR is located in the traveling area Y. Accordingly, the travel control unit 12 switches the driving mode of the vehicle 2 from the autonomous driving mode to the manual driving mode and controls the steering device 4 so as to turn each wheel 3 in response to the turning operation on the operation element 10 by the occupant X.

In another embodiment, the determining unit 73 may determine whether each turning line XR, XL crosses one of the edges YR, YL of the traveling area Y and thus reaches an inside of the traveling area Y while the travel control unit 12 selects the autonomous driving mode and a proximal end (an end on a side of the vehicle 2) of each turning line XR, XL is located outside the traveling area Y (namely, the lateral center of the vehicle 2 is located outside the traveling area Y). In a case where the above-mentioned determination by the determining unit 73 is No, the travel control unit 12 may maintain the driving mode of the vehicle 2 in the autonomous driving mode. On the other hand, in a case where the above-mentioned determination by the determining unit 73 is Yes, the travel control unit 12 switches the driving mode of the vehicle 2 from the autonomous driving mode to the manual driving mode and thus controls the steering device 4 so as to turn each wheel 3 in response to the turning operation on the operation element 10 by the occupant X. Accordingly, the driving mode of the vehicle 2 can be switched from the autonomous driving mode to the manual driving mode on condition that the vehicle 2 is moving in a direction to decrease the deviation of the vehicle 2 from the traveling area Y. Thus, it is possible to switch the driving mode of the vehicle 2 from the autonomous driving mode to the manual driving mode at an appropriate timing.

In the present embodiment, as described above, in a case where the determining unit 73 determines that the right turning line XR is not located in the traveling area Y while the manual driving mode is selected, the travel control unit 12 switches the driving mode of the vehicle 2 from the manual driving mode to the autonomous driving mode. Accordingly, the driving mode of the vehicle 2 can be switched from the manual driving mode to the autonomous driving mode at an appropriate timing (at a timing not too early or too late). Incidentally, such a technical effect is exhibited in a case where the determining unit 73 determines that the left turning line XL is not located in the traveling area Y while the manual driving mode is selected.

By the way, in the present embodiment, the generating unit 71 is configured to generate each turning line XR, XL from the lateral center of the vehicle 2. Accordingly, in a case where the vehicle 2 turns along each turning line XR, XL, a lateral end of the vehicle 2 may slightly deviate from the traveling path P. In order to suppress this deviation, at least one of the following Methods 1 to 3 may be applied.

[Method 1] to generate each turning line XR, XL based on the turning radius acquired by adding the prescribed margin to the minimum turning radius

[Method 2] to set a partial area in the vehicle width direction (for example, an area other than the outside area M in the vehicle width direction) of the traveling path P to the traveling area Y

[Method 3] to generate turning lines XR, XL from left and right ends of the vehicle 2

As described above, in the present embodiment, the above deviation is suppressed by the Method 2.

In the present embodiment, the vehicle control system 1 is used for the traveling path P curved in an arc shape. On the other hand, in another embodiment, the vehicle control system 1 may be used for the traveling path P bent in an L shape. In this way, the vehicle control system 1 can be used for the traveling paths P having various shapes and can cope with various traveling states of the vehicle 2.

Concrete embodiments of the present invention have been described in the foregoing, but the present invention should not be limited by the foregoing embodiments and various modifications and alterations are possible within the scope of the present invention.

The invention claimed is:

1. A vehicle control system, comprising:
a travel control unit configured to switch a driving mode of a vehicle between an autonomous driving mode and a manual driving mode;
a traveling state detecting unit configured to detect a traveling state of the vehicle;
a generating unit configured to generate at least one turning line based on a signal from the traveling state detecting unit, the turning line indicating a prospective turning trajectory of the vehicle;
an external environment recognizing device configured to detect a state of an external environment of the vehicle;
a setting unit configured to set a traveling area in front of the vehicle in a traveling direction thereof based on a signal from the external environment recognizing device, the traveling area being an area in which the vehicle should travel; and
a determining unit configured to determine whether the turning line is located in the traveling area,
wherein in a case where the determining unit determines that the turning line is not located in the traveling area while the manual driving mode is selected, the travel control unit switches the driving mode of the vehicle from the manual driving mode to the autonomous driving mode.

2. The vehicle control system according to claim 1, wherein the generating unit is configured to respectively generate a right turning line and a left turning line, the right turning line being the turning line to the right, the left turning line being the turning line to the left, and
the determining unit determines whether the right turning line is located in the traveling area in a case where the vehicle approaches a left edge of the traveling area, and determines whether the left turning line is located in the traveling area in a case where the vehicle approaches a right edge of the traveling area.

3. The vehicle control system according to claim 2, wherein the determining unit compares the right turning line with the left edge of the traveling area and thus determines whether the right turning line is located in the traveling area in the case where the vehicle approaches the left edge of the traveling area, and compares the left turning line with the right edge of the traveling area and thus determines whether the left turning line is located in the traveling area in the case where the vehicle approaches the right edge of the traveling area.

4. The vehicle control system according to claim 1, further comprising a turning state detecting unit configured to detect a turning state of the vehicle,
wherein the generating unit is configured to correct the turning line based on a signal from the turning state detecting unit.

5. The vehicle control system according to claim 1, wherein the external environment recognizing device includes an obstacle detecting unit configured to detect an obstacle present around the vehicle, and the setting unit is configured to set the traveling area such that the traveling area avoids the obstacle.

6. The vehicle control system according to claim 1, further comprising:
   an operation element configured to receive a turning operation;
   a steering device configured to turn wheels in response to the turning operation on the operation element; and
   a reaction force applying device configured to increase a reaction force to the turning operation on the operation element in the case where the determining unit determines that the turning line is not located in the traveling area.

7. The vehicle control system according to claim 1, further comprising:
   an operation element configured to receive a turning operation; and
   a steering device configured to turn wheels in response to the turning operation on the operation element,
   wherein in the case where the determining unit determines that the turning line is not located in the traveling area, the travel control unit does not transmit a control signal corresponding to the turning operation to the steering device even when the operation element receives the turning operation.

8. The vehicle control system according to claim 6, wherein the operation element is configured to issue a warning in the case where the determining unit determines that the turning line is not located in the traveling area.

9. The vehicle control system according to claim 7, wherein the operation element is configured to issue a warning in the case where the determining unit determines that the turning line is not located in the traveling area.

10. The vehicle control system according to claim 1, wherein the traveling state detecting unit includes a vehicle speed sensor configured to detect a vehicle speed of the vehicle, and
    the generating unit is configured to decrease a degree of curvature of the turning line as the vehicle speed of the vehicle increases.

11. The vehicle control system according to claim 1, wherein the generating unit is configured to generate the turning line such that curvature of the turning line increases toward the front in the traveling direction of the vehicle.

12. The vehicle control system according to claim 1, wherein in a case where the determining unit determines that the turning line crosses an edge of the traveling area and thus reaches an inside of the traveling area while the autonomous driving mode is selected and an end of the turning line on a vehicle side is located outside the traveling area, the travel control unit switches the driving mode of the vehicle from the autonomous driving mode to the manual driving mode.

* * * * *